Aug. 9, 1966 D. BINCH 3,265,808
INSULATED HIGH TEMPERATURE ELECTRICAL CONDUCTOR
AND PROCESS FOR MAKING SAME
Filed Dec. 3, 1963
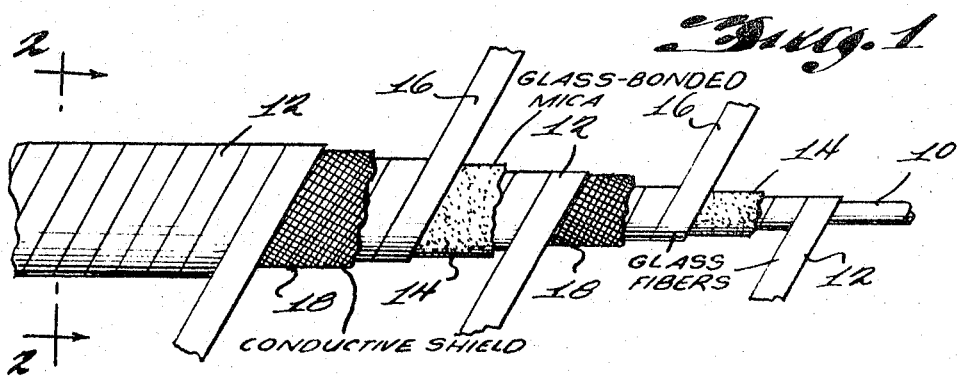
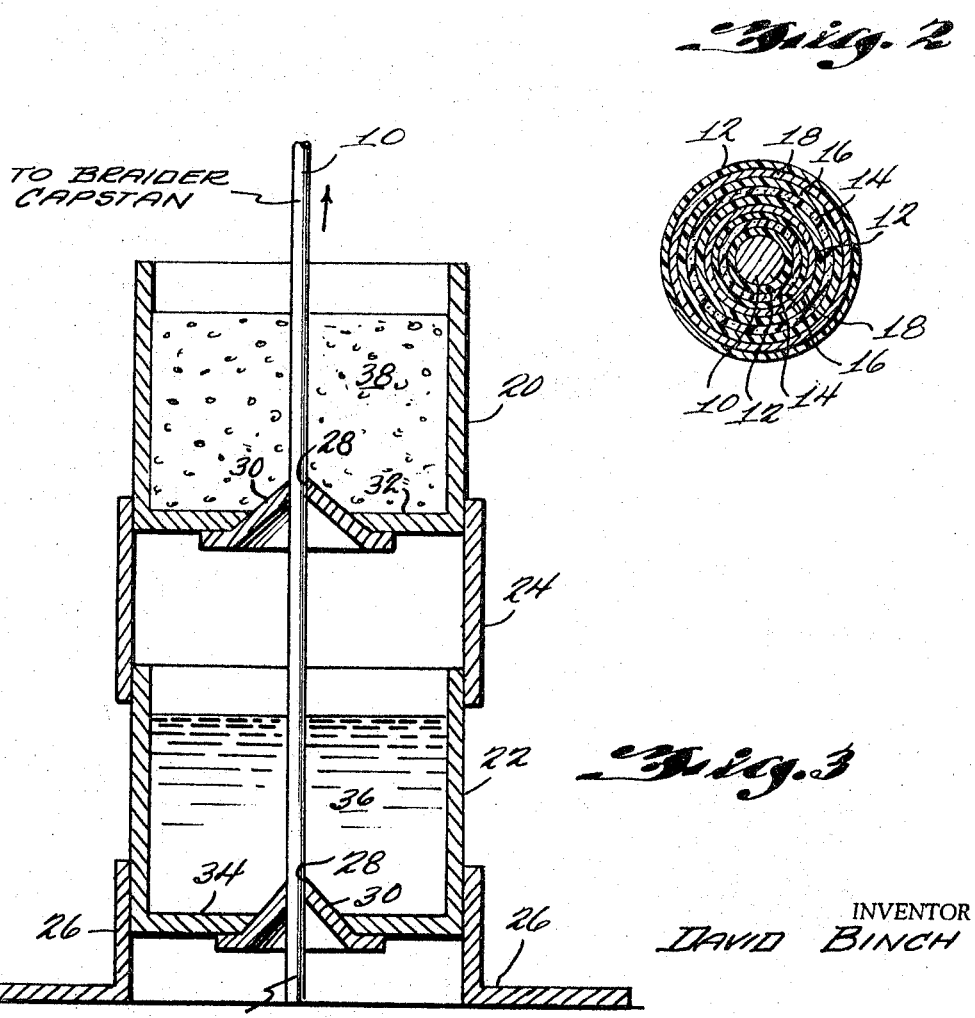
INVENTOR
DAVID BINCH
BY
Cushman, Darby & Cushman
ATTORNEYS

United States Patent Office 3,265,808
Patented August 9, 1966

3,265,808
INSULATED HIGH TEMPERATURE ELECTRICAL CONDUCTOR AND PROCESS FOR MAKING SAME
David Binch, Burlington, Vt., assignor, by mesne assignments, to Haveg Industries, Inc., a wholly-owned subsidiary of Hercules Powder Company, New Castle, Del., a corporation of Delaware
Filed Dec. 3, 1963, Ser. No. 327,773
9 Claims. (Cl. 174—105)

This invention relates to a high temperature electrical assembly and to a process for producing insulated electrical conductors, windings, coils, and the like.

Heretofore, thermally-stable electrical insulators were fabricated generally from non-flexible inorganic materials. In instances where flexibility was achieved the insulation material did not exhibit thermal stability at temperatures at 1000° F. or above. Later proposals employed mica or mica flakes as a dielectric material in the fabrication of high temperature electrical conductors. However, the use of mica or mica flakes has serious disadvantages since they are generally plate-like in form, that is, they have a relatively small thickness compared to their length or width. Thus, particles of such a dimension do not experience uniform compactness around, for instance, a wire conductor and they therefore tend to slump or form non-uniform pockets around the wire when subjected to motion or vibration. This phenomenon produces a relatively short-lived article or product and is consequently commercially unattractive.

It is therefore an object of the present invention to overcome the disadvantages of the above types of electrical insulators for high temperature service.

It is another object of the instant invention to provide a flexible electrical assembly using a glass-bonded mica insulating composition.

It is a further object of the instant invention to provide a high temperature wire using electrically conductive material superimposed by a layer of glass fibers coated with a glass-bonded mica adhesion agent which in turn is provided with glass-bonded mica and thereafter supplied with a layer of glass fibers.

It is yet another object of the instant invention to provide a novel high temperature electric assembly comprising a plurality of coverings of insulating material comprising a first layer of glass fibers, a second layer of a dielectric consisting essentially of glass-bonded mica, a third layer of glass fibers and a conductive support interposed between successive coverings.

It is still a further object of the instant invention to provide a novel process for producing a high temperature electric assembly employing glass-bonded mica as a dielectric composition.

Still, further objects and the entire scope of the applicability of the present invention will become apparent from the detailed description given hereinafter. It should be understood, however, that the detailed description and the specific examples while indicating preferred embodiments of the invention are given by way of illustration only since various changes and modifications within the spirit and scope of the invention will become apparent to those skilled in the art from this detailed description.

It has now been found that these objects can be attained by providing an electrically conductive material with a first layer of glass fibers, coating the conductor provided with the wrapping of glass fibers with an adhesion agent which is volatile below 800° F., applying a glass-bonded mica to the adhesion agent coated conductor, wrapping the glass-bonded mica covered conductor with a second layer of glass fibers and heating to at least 800° F. to remove volatiles. The heating is normally for a period of at least 4 hours.

In the accompanying drawing, in which like reference characteristics indicate like parts, FIGURE 1 is a broken view of a high temperature electrical assembly in accordance with this invention wherein the various layers have been partially unwrapped to reveal the structure;

FIGURE 2 is a sectional view of the electrical assembly of FIGURE 1; and

FIGURE 3 is a cross-sectional view in elevation illustrating the manufacture of a high temperature wire.

Referring more specifically to FIGURES 1 and 2 of the drawing, there is provided an electrically conductive member 10 which can be any material consistent with 1000° F. or higher continuous service such as 10% nickel-plated copper, 27% nickel-plated copper, nickel-clad copper, pure nickel or stainless steel. It may be solid, or stranded for instance, when a cable is desired. The conductor 10 is spirally-wound thereabout with glass fibers 12 which may be in any convenient form such as yarn, strands, woven or non-woven tape. Superimposed on the glass fibers of layer 12 there is a layer 14 of dielectric material comprising a glass-bonded mica which in turn is superimposed by a layer 16 of glass fibers in a form described above. In a specific example the conductor was 10% nickel-plated copper, the glass fibers were in the form of yarn and the glass-bonded mica was a material commercially available as Havelex.

This sequence of layers may be repeated as often as desired to produce an electrical assembly. There is preferably provided between each sequence of layers a conductive shield 18 to provide mechanical strength and/or an electrical grounding circuit which can be a material compatible with service temperatures of 1000° F., such as 10% nickel-plated copper, 27% nickel-plated copper, nickel-clad copper, pure nickel, or stainless steel. Thus in the specific example described braided 10% nickel-plated copper was employed.

The glass-bonded mica may be of any conventional composition and typical formulations include those made by mixing 50 to 75 parts of comminuted mica with about 50 to 25 parts of unmodified lead borate containing 5 to 8% of raw cryolite based on the lead borate. Examples of suitable materials are set forth in U.S. Patent No. 2,400,337, to Beuchner. There can also be used leadless glass-bonded mica compositions such as any of those set forth in Michael Patent No. 2,566,902. Such formulations contain by weight 45 to 85% mica and a binder comprising the vitrified product of a mixture of 11 to 21% aluminum trihydrate, 7 to 21% of barium or strontium carbonate, 37 to 67% boric acid and a fluoride from the class of cryolite, sodium fluoride, sodium silico fluoride, sodium potassium fluoride, potassium fluoroborate, sodium fluoroborate, calcium fluoride, beryllium fluoride, potassium aluminum fluoride, and potassium silico fluoride, the fluoride being present in an amount equivalent to 10 to 32% cryolite based on the fluoride content of the fluoride. A specific example of such a composition contains 85% mica and 15% of a mixture made up of 20.5% cryolite, 9.6% barium carbonate, 15.5% aluminum hydrate and 54.4% boric acid. In the example described in connection with FIGURES 1–3, the glass-bonded mica composition employed had the following composition:

| Screen mesh (Tyler) | Glass (lead borate) | Mica |
|---|---|---|
| 80 | Trace | 28.8 |
| 100 | Trace | 29.5 |
| 200 | 0.2 | 21.0 |
| 325 | 30.6 | |
| 400 | 12.6 | 18.0 |
| Pan | 56.6 | 2.7 |

There was employed 60% of mica and 40% glass by weight in the composition. The composition is in the form of a granular powder.

The adhesion agent to hold the glass-bonded mica in position as it is being formed around the wire is preferably a silicone oil and more preferably polydimethyl siloxane which is commercially available. In the specific example in connection with FIGURES 1–3 the polydimethyl siloxane had a viscosity of about 350 centistokes. However, other polydimethyl siloxanes as well as other silicone fluids with viscosities of 50 to 60,000 centistokes can be used. Other oils or lubricants can also be used provided that they are essentially removed before heating operations conducted at temperatures up to about 800° F. Examples of other such adhesion agents are solutions of polymethylmethacrylate in an organic solvent such as benzene to provide the proper viscosity, glycerol, hydrocarbon oils boiling below 800° F., etc.

The amount of adhesion agent used in conjunction with the glass-bonded mica material of this invention is not critical and need be only sufficient to insure the introduction of the glass-bonded mica in amounts sufficient to act as a binder for the electrical assembly and insure the desired high temperature service characteristics. It will be understood, however, that the amount is easily determined by those skilled in the art and will depend, for instance, on the particular choice of adhesion agent, the particular choice of a glass-bonded mica composition, the diameter of the conductive member being processed, the rate of production, etc. Conveniently, in the specific example described in connection with the drawing, there were used three parts of polydimethyl siloxane to one part of glass-bonded mica by weight.

Reference is now made to FIGURE 3 which shows the processes and apparatus for producing the high temperature electrical assembly according to the invention.

The apparatus consists essentially of two stainless steel cups 20 and 22 joined together by brackets 24 so that cup 20 is positioned vertically on center line approximately one inch above cup 22. The two joined cups, 20 and 22, are then located vertically on center line beneath a standard braiding machine (not shown) between the pay-off spool and the main rotating carriages (also not shown). In this position the joined cups 20 and 22 are fastened by bracket 26. Each of cups 20 and 22 has an aperture 28 provided in a soft resilient nipple-like means 30 provided in their respective bottoms 32 and 34 respectively. Nipple-like means 30, preferably fabricated of rubber, is provided to permit passage of electrical conductive member 10 through cups 20 and 22 with no loss of contents. Cup 22 contains a silicone lubricant 36, e.g. polydimethyl siloxane 350 cps., and cup 20 contains glass-bonded mica 38.

In operation, the conductor 10 is given a braided glass yarn covering on a standard machine. The conductor 10 with this single braided glass yarn covering 12 is placed on the pay-off spool of the braiding machine which has been provided with the glass-bonded mica applying means described above. As the conductor 10 with the yarn covering 12 travels upwardly through cup 22, a quantity of silicone lubricant 36 adheres to the yarn covering 12. The nipple-like device 30 provided at the bottom 32 of cup 20 strips the excess lubricant 36 from the glass yarn covering 12 as the conductor 10 enters cup 20 through aligned hole 28. Due to the viscosity of the silicone lubricant 36, glass-bonded mica adheres to the lubricant-impregnated yarn covering 12, as it passes through cup 20, in a quantity which on drying imparts to the final product high temperature service characteristics. The conductor 10 with the glass yarn covering 12 and the silicone lubricant glass-bonded mica coating then passes from cup 20 to braiding carriages (not shown) where a second glass yarn covering 16 is applied to hold the silicone glass bonded mica layer in place. Additional passes through this arrangement can be made to build up any desired number of layers. Preferably, after the glass layer 16 has been applied a conductive support 18 can be positioned between this first covering and any or all of subsequent three-layered coverings. This conductive support can be, for instance, a braided metallic shield fabricated from a material compatible with 1000° F. temperature service and can be 10% nickel-plated copper, for example, or 27% nickel-plated copper, nickel-clad copper, pure nickel, or stainless steel.

Advantageously, an outer covering can be applied which may be similar to the layers applied to the conductor or it can be braided glass yarn without an intermediate layer of silicone glass-bonded mica.

After applying one or more layers as described above, the electrical assembly is heated to a temperature up to about 800° F. for a period sufficient to drive off substantially all material volatile at 800° F., i.e., the adhesion agent. Generally this operation is continued for a period of four or more hours, and can be conducted in any convenient heating apparatus such as a mechanical convection oven.

The glass-bonded mica thus serves as a binding agent for the glass fiber layers. The glass-bonded mica dielectric material packs in a much more uniform fashion than does mica flakes and does not tend to slump or form non-uniform pockets around the wire when subjected to motion or vibration as is the case with ordinary ground mica. The net result is a flexible thermally stable wire insulation.

While the invention has been described with reference to a particular embodiment therefor, it will be apparent to those skilled in the art that there are many modifications still within the true scope of the invention and therefore the invention is to be limited only as indicated by the scope of the appended claims.

I claim:

1. A high temperature electrical assembly comprising a conductor, a first layer of glass fibers superimposed on said conductor, a second layer of dielectric comprising glass-bonded mica superimposed on said first layer and a third layer of glass fibers superimposed on said second layer.

2. A high temperature electrical assembly comprising a metal conductor coated with a plurality of coverings of an insulating material, each of said coverings comprising a first layer of glass fibers superimposed on said conductor, a second layer of dielectric comprising glass-bonded mica superimposed on said first layer and a third layer of glass fibers superimposed on said second layer.

3. A high temperature wire comprising a conductor, a first layer of woven glass tape spirally wound around said conductor, a second layer of a dielectric consisting essentially of a glass-bonded mica superimposed on said first layer and a third layer of woven glass tape spirally wound around said glass-bonded mica layer.

4. A high temperature wire comprising a conductor coated with a plurality of coverings of an insulating material each of said coverings comprising a first layer of glass fibers spirally wound around said conductor, a second layer of a dielectric consisting essentially of glass-bonded mica, a third layer of glass fibers spirally wound around said glass-bonded mica, and a metal conductive support interposed between successive coverings.

5. A process of producing a high temperature electrical assembly comprising wrapping an electrical conductor with a layer of glass fibers, coating the conductor provided with the wrapping of glass fibers with an adhesion agent volatile at 800° F., applying glass-bonded mica to the adhesion agent coated conductor, wrapping said glass-bonded mica covered conductor with a layer of glass fibers and heating to remove said adhesive agent.

6. A process of producing a high temperautre wire comprising coating a conductor with a plurality of coverings of an insulating material each of said coverings comprising three layers, said process comprising spirally wrapping said conductor with a first layer of woven glass tape, coating the conductor provided with said first layer with an adhesion agent volatile at 800° F., applying glass-bonded mica to the adhesion agent coated conductor, spirally wrapping said glass-bonded mica covered conductor with a second layer of woven glass tape and providing a conductive support between successive coverings and heating to remove said adhesive agent.

7. A process of producing a high temperature electrical assembly comprising passing an electrical conductor having a wrapping of glass fibers through a liquid adhesion agent volatile at 800° F., applying glass-bonded mica to the adhesive treated glass wrapped conductor and heating to remove the adhesive.

8. A process according to claim 7 wherein the adhesive is a liquid silicone.

9. A process according to claim 8 wherein the silicone is a polydimethyl siloxane.

References Cited by the Examiner

UNITED STATES PATENTS

| | | |
|---|---|---|
| 2,400,337 | 5/1946 | Buechner. |
| 2,479,924 | 8/1949 | Gillis. |
| 2,566,902 | 9/1951 | Michael _____ 106—39 |
| 2,739,638 | 3/1956 | Lewis et al. _____ 174—110 |

LARAMIE E. ASKIN, *Primary Examiner.*

JOHN F. BURNS, ROBERT K. SCHAEFER, *Examiners.*

D. A. KETTLESTRINGS, H. HUBERFELD,
*Assistant Examiners.*